United States Patent
Futahashi et al.

(10) Patent No.: US 10,465,648 B2
(45) Date of Patent: Nov. 5, 2019

(54) METHOD OF ACTUATING AN OCEAN CURRENT ELECTRIC POWER GENERATOR AND AN ACTUATION CONTROL APPARATUS

(71) Applicant: MITSUBISHI HEAVY INDUSTRIES, LTD., Tokyo (JP)

(72) Inventors: Kensuke Futahashi, Tokyo (JP); Tetsuhei Kobayashi, Tokyo (JP); Shin Asano, Tokyo (JP); Sho Onodera, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/507,017

(22) PCT Filed: Sep. 7, 2015

(86) PCT No.: PCT/JP2015/075325
§ 371 (c)(1),
(2) Date: Feb. 27, 2017

(87) PCT Pub. No.: WO2016/039290
PCT Pub. Date: Mar. 17, 2016

(65) Prior Publication Data
US 2017/0260962 A1    Sep. 14, 2017

(30) Foreign Application Priority Data

Sep. 12, 2014 (JP) .................. 2014-187009

(51) Int. Cl.
F03B 15/00 (2006.01)
F03B 13/10 (2006.01)
(Continued)

(52) U.S. Cl.
CPC ............ *F03B 15/005* (2013.01); *F03B 13/10* (2013.01); *F03B 17/005* (2013.01);
(Continued)

(58) Field of Classification Search
CPC ...... F03B 13/10; F03B 15/005; F03B 17/005; H02K 7/102; H02K 7/1823; H02P 9/06; H02P 9/08
See application file for complete search history.

(56) References Cited

U.S. PATENT DOCUMENTS 2,501,696 A * 3/1950 Souczek ............... F03B 17/061
290/43
4,383,182 A * 5/1983 Bowley ................. F03B 13/183
290/43
(Continued)

FOREIGN PATENT DOCUMENTS

EP    2 657 122 A2    10/2013
EP    2 657 124 A2    10/2013
(Continued)

OTHER PUBLICATIONS

English translation of International Preliminary Resrport on Patentability (Form PCT/IB/373) issued in counterpart International Application No. PCT/JP2015/075325 dated Mar. 23, 2017, with Form PCT/IB/338, and PCT/ISA/237 (5 pages).
(Continued)

Primary Examiner — Tulsidas C Patel
Assistant Examiner — S. Mikailoff
(74) Attorney, Agent, or Firm — Westerman, Hattori, Daniels & Adrian, LLP

(57) ABSTRACT

An ocean current electric power generator includes a mechanical brake that restricts a rotation of a rotor shaft of a rotatable wing, and a power transmission mechanism that is disposed between the rotor shaft and an electric power
(Continued)

generator. The power transmission mechanism includes a switching section that switches between a power transmission state and a power disconnection state, a load application section that applies a rotation load on the rotor shaft during the power disconnection state, and a speed varying section that varies a revolution speed of the rotor shaft, and transmits the revolution to the electric power generator during the power transmission state.

7 Claims, 8 Drawing Sheets

(51) Int. Cl.

| | | |
|---|---|---|
| *F03B 17/00* | (2006.01) | |
| *H02K 7/102* | (2006.01) | |
| *H02K 7/18* | (2006.01) | |
| *H02P 9/06* | (2006.01) | |
| *H02P 9/08* | (2006.01) | |
| *F03B 17/06* | (2006.01) | |

(52) U.S. Cl.
CPC .......... *F03B 17/061* (2013.01); *H02K 7/102* (2013.01); *H02K 7/1823* (2013.01); *H02P 9/06* (2013.01); *H02P 9/08* (2013.01); *F05B 2260/406* (2013.01); *Y02E 10/22* (2013.01); *Y02E 10/226* (2013.01); *Y02E 10/28* (2013.01); *Y02E 10/38* (2013.01)

(56) References Cited

U.S. PATENT DOCUMENTS

| | | | | |
|---|---|---|---|---|
| 6,091,161 A | * | 7/2000 | Dehlsen | B63G 8/18 290/43 |
| 7,682,126 B2 | * | 3/2010 | Parker | F03B 17/061 415/3.1 |
| 9,080,548 B2 | * | 7/2015 | Dehlsen | F03B 17/061 |
| 9,745,951 B1 | * | 8/2017 | Doyle | F03B 15/06 |
| 2010/0181774 A1 | * | 7/2010 | Dehlsen | B63B 21/50 290/54 |
| 2013/0106105 A1 | * | 5/2013 | Dehlsen | F03B 17/061 290/43 |
| 2013/0214537 A1 | * | 8/2013 | Hashimoto | F03D 15/00 290/55 |
| 2013/0249214 A1 | * | 9/2013 | Ichinose | F03D 9/255 290/44 |
| 2017/0314525 A1 | * | 11/2017 | Futahashi | F03B 13/10 |
| 2019/0063397 A1 | * | 2/2019 | Asano | F03B 17/061 |

FOREIGN PATENT DOCUMENTS

| | | |
|---|---|---|
| EP | 2 657 512 A2 | 10/2013 |
| JP | 2002-535188 A | 10/2002 |
| JP | 2013-227964 A | 11/2013 |

OTHER PUBLICATIONS

Takagi et al., "Technical Feasibility Study on a Contra-rotating Ocean Current Turbine", Journal of the Japan Society of Naval Architects and Ocean Engineers, No. 17, pp. 107-114, Jun. 2013. (cited in the specification).

International Search Report dated Dec. 1, 2015, issued in counterpart International Application No. PCT/JP2015/075325 (1 page).

* cited by examiner

FIG. 12
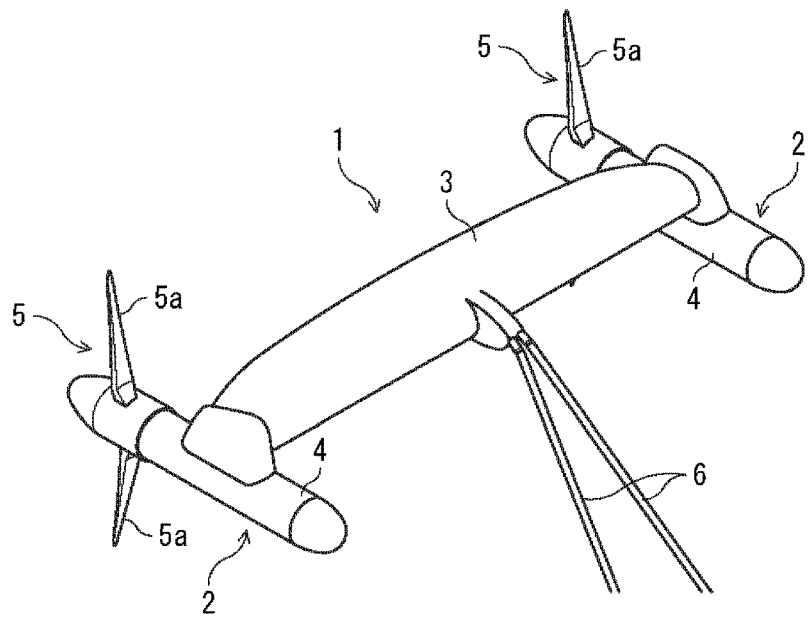
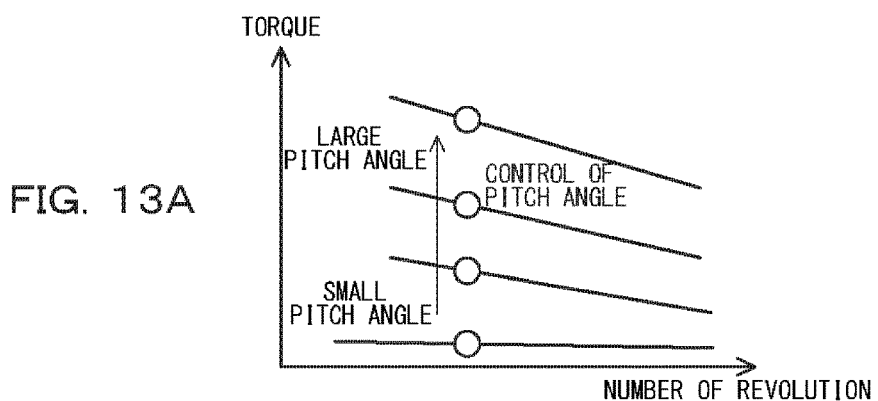
FIG. 13A
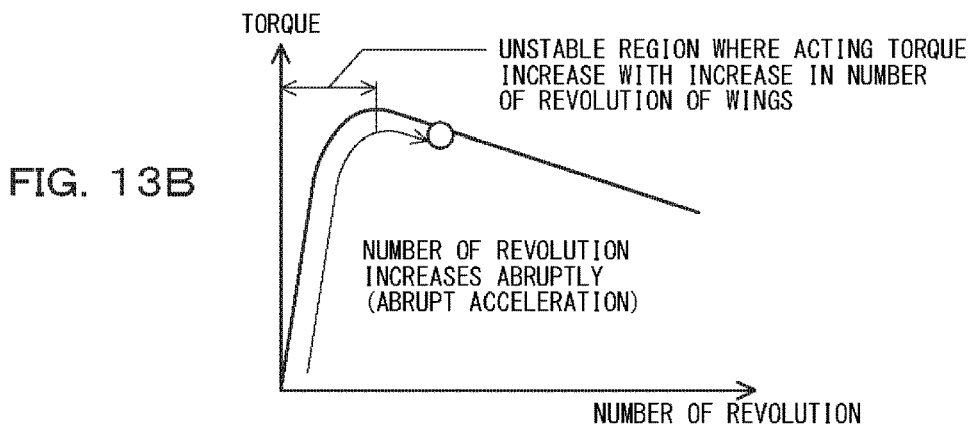
FIG. 13B

METHOD OF ACTUATING AN OCEAN CURRENT ELECTRIC POWER GENERATOR AND AN ACTUATION CONTROL APPARATUS

TECHNICAL FIELD

The present invention relates to a method of actuating an ocean current electric power generator that generates electric power utilizing ocean current energy, and an actuation control apparatus for the ocean current electric power generator.

BACKGROUND ART

Recently, power generation techniques utilizing a wide variety of natural energy have been developed. As an example, powerful ocean currents, such as the Japan Current, are also energy resources and ocean current electric power generators that generate electric power utilizing the ocean current energy have also been developed. Such an ocean current electric power generator generates electric power by rotating a rotatable wing with the ocean current energy, thereby rotating an electric power generator coupled to the shaft of the rotatable wing.

One type of such ocean current electric power generators is an undersea floating ocean current electric power generator (water floating type ocean current electric power generator), and is disclosed in Patent Document 1, for example. This undersea floating ocean current electric power generator includes an ocean current electric power generator configured as a float with certain buoyancy, and ocean current electric power generator is connected to a mooring cable extending from ocean bottom, such that the ocean current electric power generator generates electric power while remaining under the ocean in the range restricted by the mooring cable. The undersea floating ocean current electric power generator has a simplified structure, without requiring a massive structure, such as a pillar of a wind electric power generator constructed on the ground.

FIG. 12 is a perspective view illustrating an undersea floating ocean current electric power generator disclosed in Patent Document 1. As shown in FIG. 12, this undersea floating ocean current electric power generator is configured as a float 1, and the float 1 is a catamaran type with one float 1 configured from two ocean current electric power generator main bodies 2, 2 and a structure 3 coupling them, for stabilizing the attitude of the float 1. Each ocean current electric power generator main body 2 includes an electric power generator (not shown) inside a nacelle (also referred to as a "pod") 4, and a rotor shaft (rotation axis) of a rotatable wing 5 is connected to the rotor of the electric power generator.

The nacelles 4 are coupled to left and right ends of the structure 3. The distal ends of mooring cables 6 are coupled to the left-right direction center of the structure 3, and the proximal ends of the mooring cables 6 is moored to an ocean bottom. The float 1 remains under the ocean in the horizontal direction and in the vertical direction in the range restricted by the mooring cables 6. The buoyancy of the float 1 balances the float 1 left and right, and the structure 3 of the float 1 has a wing shape facing the ocean current direction. As a result, the float 1 generates electric power, while changing its orientation in response to a change in the direction of the ocean current, such that the front face (the front face of the rotatable wing 5) thereof opposes to the ocean current direction.

Also, a downstream scheme is employed wherein the rotatable wing 5 is disposed at the rear of the nacelle 4 (the downstream to the ocean current). By disposing the rotatable wing 5 downstream to the nacelle 4 in this manner, it become easier to orient the front face of the float 1 (the front face of the rotatable wing 5) to face the ocean current direction. It is difficult to provide the undersea floating ocean current electric power generator with a driving apparatus that actively controls the yaw direction of the float 1 (controls to align the rotor shaft of the rotatable wing 5 to the ocean current direction). The downstream scheme is employed for that reason, and the nacelles 4 and the structure 3 of the float 1 are shaped to orient to the ocean current direction such that the front face of the float 1 passively faces the ocean current direction.

Further, while the float (undersea floating ocean current electric power generator) 1 moored to the mooring cables 6 remains under the ocean, the float 1 stays in the position where the ocean current force exerted on the float 1, the buoyancy exerted on the float 1, and the tension of the mooring cables 6, are balanced. Specifically, on the float 1, the buoyancy acts vertically upward, the ocean current force acts in the ocean current direction (horizontal direction), and the tension of the mooring cables 6 acts against the buoyancy and the ocean current force. Therefore, if the ocean current force is smaller (i.e., if the current speed of the ocean current is lower), the float 1 ascends to a relatively shallow depth in the ocean. If the ocean current force is greater (i.e., if the current speed of the ocean current is higher), the float 1 descends to a relatively deep depth.

In the meantime, the depth direction profile of the current speed of the ocean current is such that the current speed reduces as the distance from the ocean bottom is smaller in the vicinity of the ocean bottom, and the current speed increases as the distance from the ocean bottom increases. Therefore, when the current speed of the ocean current increases, the float 1 descends down the ocean, and is balanced at a depth where the current speed is appropriately low in the current speed profile in the depth direction. Or, when the current speed of the ocean current becomes smaller, the float 1 ascends in the ocean, and is balanced at a depth where the current speed is appropriately high in the current speed profile in the depth direction.

Patent Document 1 employs the characteristic of the ocean current electric power generator in that the ocean current electric power generator ascends or descends depending on the current speed. It discloses that utilization of such a control for passively and autonomously adjusting the level in the depth direction (depth of water) of the ocean current electric power generator (also referred to as a passive depth control; PDC) eliminates the need for any active control (active depth control).

In the meantime, the rotatable wing 5 includes (generally two or three) blades 5a. A majority of the ocean current electric power generators are proposed as those having a variable pitch angle wing, wherein the wing pitch angles of the blades 5a are adjustable (e.g., Non-Patent Document 1). One of the reasons why a variable pitch angle wing is employed is that a smooth actuation can be achieved with smaller wing projection areas by increasing the wing pitch angle to reduce the input torque to the rotor shaft during an actuation, and subsequently increasing the wing projection areas gradually to gradually increase the number of revolution (revolution speed) of the rotor shaft and the driving power (refer to FIG. 13A).

RELATED-ART DOCUMENTS

Patent Document

Patent Document 1: US 2013/0106105 A

Non-Patent Document

Non-Patent Document 1: Journal of the Japan Society of Naval Architects and Ocean Engineers, No. 17, p. 107, June, 2013

SUMMARY OF INVENTION

Technical Problem

As set forth above, adopting a variable pitch angle wing to an ocean current electric power generator requires a mechanism for varying the pitch angle and a driving source, which makes the structure complex. Once an ocean current electric power generator is installed under the ocean, maintenances cannot be provided easily and hence simplifying the configuration as much as possible is preferred to reduce the need for maintenances.

In contrast, a fixed pitch angle wing type with a fixed wing pitch angle allows a simplified machine configuration as compared to a variable pitch angle wing type, and does not require maintenances of a mechanism for varying the pitch angle and a driving source required for a variable pitch angle wing. A fixed pitch angle wing type, however, has a disadvantage of difficulty of control of an actuation as compared to the variable pitch angle wing type.

Specifically, with a fixed pitch angle wing type, a wing projection area is larger even during an actuation and thus the input torque to a rotor shaft of a rotatable wing is increased. As a result, when a fixed pitch angle wing receives an ocean current, the number of revolution of the rotor shaft would increase quite rapidly. As an example, FIG. 13B is a graph of the number of revolution versus the torque when an ocean current electric power generator having a fixed pitch angle wing is actuated. As shown in FIG. 13B, in the region where the number of revolution of the rotor shaft increases, there is an unstable region where the acting torque by the ocean current increases with an increase in the number of revolution of the wing. Therefore, a fixed pitch angle wing type may have a risk of an abrupt acceleration through that unstable region upon an actuation under a constant current speed, which may cause damages to the wing.

Even when a wing having a sufficient strength is used, there is another issue in that a large cooling apparatus is required for dissipating heat generated by the ocean current electric power generator when there is a latency period until the ocean current electric power generator enters the stable region and is combined to an electric power system. Specifically, during the latency period until combining to the electric power system, the input driving power from a rotor shaft (number of revolution×torque) must be dissipated to the outside as thermal energy since it cannot be consumed as electric energy. The heat to be dissipated is enormous and thus a large cooling apparatus is required. Providing a large cooling apparatus to an ocean current electric power generator with a limited footprint makes the ocean current electric power generator unfeasible due to its sizing.

The present invention is conceived of in light of the above-described issues, and an object thereof is to provide a method of actuating an ocean current electric power generator and an actuation control apparatus for the ocean current electric power generator which achieve a smooth actuation of the ocean current electric power generator using a fixed pitch angle wing as a rotatable wing.

Solution to Problem (1) In order to achieve the above-described object, a method of actuating an ocean current electric power generator under an ocean is provided, wherein a rotor of an electric power generator enclosed in a nacelle is driven by a rotatable wing that protrudes outside the nacelle and has a fixed pitch angle, the ocean current electric power generator including: a mechanical brake that restricts a rotation of a rotor shaft of the rotatable wing; and a power transmission mechanism that is disposed between the rotor shaft of the rotatable wing and the rotor of the electric power generator, the power transmission mechanism including: a switching section that switches between a power transmission state and a power disconnection state; a load application section that applies a rotation load on the rotor shaft of the rotatable wing during the power disconnection state; and a speed varying section that varies a revolution speed of the rotor shaft of the rotatable wing, and transmits the revolution to the rotor of the electric power generator during the power transmission state, the method including the following steps that are carried out in sequence: a brake releasing step of setting the power transmission mechanism to the power disconnection state by the switching section to switch the mechanical brake from an applied state to a released state; a rotatable wing accelerating step of increasing the revolution speed of the rotor shaft of the rotatable wing while applying the rotation load on the rotor shaft of the rotatable wing by the load application section; an electric power generator startup step of switching the power transmission mechanism to the power transmission state by the switching section, and initiating the rotation of the rotor of the electric power generator; an electric power generator accelerating step of increasing a revolution speed of the rotor of the electric power generator by the speed varying section; and an electric power generation initiation step of combining the electric power generator to a system power supply to initiate a power generation (2) Preferably, the brake releasing step, the rotatable wing accelerating step, the electric power generator startup step, the electric power generator accelerating step, and the electric power generation initiation step are carried out while the ocean current electric power generator is positioned in the vicinity of the surface of the ocean, the method further includes: a rotatable wing accelerating step of sinking the ocean current electric power generator to a predetermined depth region under the surface of the ocean where a current speed is high, and increasing the velocity of the rotor shaft of the rotatable wing, after the electric power generation initiation step; and a normal electric power generation step of generating the electric power normally while controlling the revolution speed of the rotor of the electric power generator such that a power generation efficiency is maximized, once the ocean current electric power generator is sunken to the predetermined depth region.

(3) Preferably, the power transmission mechanism is a hydraulic power transmission mechanism that transmits a driving power using hydraulic oil, the hydraulic power transmission mechanism includes: a hydraulic pump driven by the rotor shaft of the rotatable wing; a hydraulic motor provided with a rotation control mechanism which is rotated with the hydraulic oil fed from the hydraulic pump to drive the rotor of the electric power generator, thereby functioning as the speed varying section; an oil feed route for feeding the hydraulic oil from the hydraulic pump to the hydraulic motor; an oil return route for recovering the hydraulic oil from the hydraulic motor to the hydraulic pump; a switching valve that opens and closes the oil feed route, thereby functioning as the switching section; an oil bypass route for bypassing the hydraulic oil from an intermediate point between the hydraulic pump and the switching valve on the oil feed route to the oil return route, thereby making the hydraulic pump function as the load application section; and a bypass valve that opens and closes the oil bypass route, the brake releasing step includes closing the switching valve and the bypass valve to release the mechanical brake, the rotatable wing accelerating step includes switching the bypass valve to open, to increase the revolution speed of the rotor shaft of the rotatable wing while applying an rotation load on the rotor shaft of the rotatable wing with an operation load of the hydraulic pump; the electric power generator startup step includes switching the switching value to open to initiate the rotation of the electric power generator; and the electric power generator accelerating step includes increasing a revolution speed of the hydraulic motor by the rotation control mechanism to increase the revolution speed of the rotor of the electric power generator.

(4) Preferably, the method includes a bypass flow route closing step of maintaining the bypass valve open until the rotatable wing accelerating step, and switching the bypass value to close after the rotatable wing accelerating step and before the normal electric power generation step.

(5) Preferably, the ocean current electric power generator is configured as a float that is an undersea floating ocean current electric power generator that generates the electric power, remaining under the ocean while being moored to a bottom of the ocean with a mooring cable, the float undergoes a passive depth control for spontaneously staying constantly in a depth of a constant current speed area by means of a balance among a buoyancy acting on the float, an acting force by the ocean current applied on the float, and a tension of the mooring cable, when a restraint of the float is released under the ocean, the brake releasing step, the rotatable wing accelerating step, the electric power generator startup step, the electric power generator accelerating step, and the electric power generation initiation step are carried out while the ocean current electric power generator is restrained under the ocean to position in the vicinity of the surface of the ocean, and the rotatable wing accelerating step includes releasing the restraint of the ocean current electric power generator such that the passive depth control is activated.

(6) Further, an actuation control apparatus that actuates an ocean current electric power generator under an ocean is provided, wherein a rotor of an electric power generator enclosed in a nacelle is driven by a rotatable wing that protrudes outside the nacelle and has a fixed pitch angle, the ocean current electric power generator including: a mechanical brake that restricts a rotation of a rotor shaft of the rotatable wing; and a power transmission mechanism that is disposed between the rotor shaft of the rotatable wing and the rotor of the electric power generator, the power transmission mechanism including: a switching section that switches between a power transmission state and a power disconnection state; a load application section that applies a rotation load on the rotor shaft of the rotatable wing load during the power disconnection state; and a speed varying section that varies a revolution speed of the rotor shaft of the rotatable wing, and transmits the revolution to the rotor of the electric power generator during the power transmission state, and the actuation control apparatus includes: a brake control section that operates, in response to an actuation command, the switching section to set the power transmission mechanism to the power disconnection state, and switches the mechanical brake from an applied state to a releasing state to release the brake; a rotatable wing acceleration control section that increases the revolution speed of the rotor shaft of the rotatable wing while applying the rotation load on the rotor shaft of the rotatable wing by the load application section, once the releasing of the brake completes; an electric power generator startup control section that operates the switching section to switch the power transmission mechanism to the power transmission state and initiates the rotation of the rotor of the electric power generator, once the revolution speed of the rotor shaft of the rotatable wing increases and is stabilized; an electric power generator acceleration control section that operates the speed varying section to increase a revolution speed of the rotor of the electric power generator, once the rotation of the rotor of the electric power generator is initiated; and a power generation initiation control section that combines the electric power generator to a system power supply to initiate a power generation, once the revolution speed of the rotor of the electric power generator is increased to a predetermined revolution speed region.

(7) Preferably, the power transmission mechanism is a hydraulic power transmission mechanism that transmits a driving power using hydraulic oil, the hydraulic power transmission mechanism includes: a hydraulic pump driven by the rotor shaft of the rotatable wing; a hydraulic motor provided with a rotation control mechanism which is rotated with the hydraulic oil fed from the hydraulic pump to drive the rotor of the electric power generator, thereby functioning as the speed varying section; an oil feed route for feeding the hydraulic oil from the hydraulic pump to the hydraulic motor; an oil return route for recovering the hydraulic oil from the hydraulic motor to the hydraulic pump; a switching valve that opens and closes the oil feed route, thereby functioning as the switching section; an oil bypass route for bypassing the hydraulic oil from an intermediate point between the hydraulic pump and the switching valve on the oil feed route to the oil return route, thereby making the hydraulic pump function as the load application section; and a bypass valve that opens and closes the oil bypass route, the brake releasing control section operates the switching valve and the bypass valve to close to release the mechanical brake, the rotatable wing acceleration control section operates the bypass valve to open, to increase the revolution speed of the rotor shaft of the rotatable wing while applying an rotation load on the rotor shaft of the rotatable wing with an operation load of the hydraulic pump, the electric power generator startup control section operates the switching valve to open to initiate the rotation of the electric power generator, and the electric power generator acceleration control section increases a revolution speed of the hydraulic motor by the rotation control mechanism to increase the revolution speed of the rotor of the electric power generator.

Advantageous Effects of Invention

In accordance with the present invention, since the revolution speed is increased after a release of a mechanical brake while a rotation load is applied on the rotor shaft when a rotation of the rotor shaft of the rotatable wing is initiated, an abrupt increase in the revolution speed is prevented and the rotor shaft is accelerated gently. Therefore, even with the rotatable wing of fixed pitch angle type having greater wing projection areas upon an actuation, in the positive feedback region where the rotatable wing tends to rotate, the revolution speed of the rotor shaft of the rotatable wing and the acting torque by the ocean current on the rotatable wing can be increased gently in a stable manner. Thus, the disadvantage of an abrupt acceleration of the rotor shaft of the rotatable wing is avoided. Thereafter, when the power transmission mechanism is switched to the power transmission state and a rotation of the rotor of the electric power generator is started, the rotation can be started smoothly. This achieves a smooth actuation of the ocean current electric power generator using the rotatable wing having a fixed pitch angle wing.

Thereafter, since the revolution speed of the rotor of the electric power generator is increased by the speed varying section in a controlled manner and the electric power generator is combined to the system power supply, a heat generation can be suppressed during a latency period of the electric power generator until the electric power generator is combined to the system power supply. There is also another advantage of reducing the size of a cooling apparatus for the ocean current electric power generator.

BRIEF DESCRIPTION OF DRAWINGS

FIGS. 7A-7D are diagrams showing the status of the hydraulic power transmission mechanism in each step of the method of actuating the undersea floating ocean current electric power generator in accordance with one embodiment, in sequence, wherein FIG. 7A shows a rotatable wing accelerating step after a brake releasing step, FIG. 7B shows an electric power generator accelerating step after an electric power generator startup step, FIG. 7C shows a rotatable wing accelerating step after an electric power generation initiation step, and FIG. 7D shows a normal electric power generation step after a bypass flow route closing step. Note that the oil route in the closed state is omitted in each step;

FIGS. 11A-11G are time charts illustrating the method of actuating the undersea floating ocean current electric power generator in accordance with one embodiment, wherein FIG. 11A shows the state of the mechanical brake, FIG. 11B shows the states of the bypass valve and the number of revolution of the rotor shaft (the number of revolution (revolution speed) of the rotor shaft of the rotatable wing), FIG. 11C shows the state of the switching valve, FIG. 11D shows the state of the hydraulic motor and the state of the number of revolution of the electric power generator, FIG. 11E shows the state of the hydraulic motor and state of the torque of the electric power generator, FIG. 11F shows the state of combining and parallel off of the electric power generator to and from system power supply, and FIG. 11G shows the state of the PDC;

FIG. 12 is a perspective view illustrating an undersea floating ocean current electric power generator in accordance with background art; and FIGS. 13A and 13B are diagrams illustrating issues of the present invention, wherein FIG. 13A is a diagram showing an actuation characteristic of an ocean current electric power generator employing a variable pitch angle wing in accordance with background art, and FIG. 13B is a diagram showing an actuation characteristic of an ocean current electric power generator employing a fixed pitch angle wing.

DESCRIPTION OF EMBODIMENTS

Hereinafter, an embodiment in in accordance with the present invention with reference to the drawings. Note that the embodiment described below is merely exemplary, and it is not intended to exclude various modifications and application of techniques not explicitly described in the following embodiment. Each element of the following embodiment may be practiced in a wide variety of modifications without departing the spirit thereof, and may be selected or omitted where necessary, or may be appropriately combined.

(Overview of Configuration of Undersea Floating Ocean Current Electric Power Generator)

Figure 3:
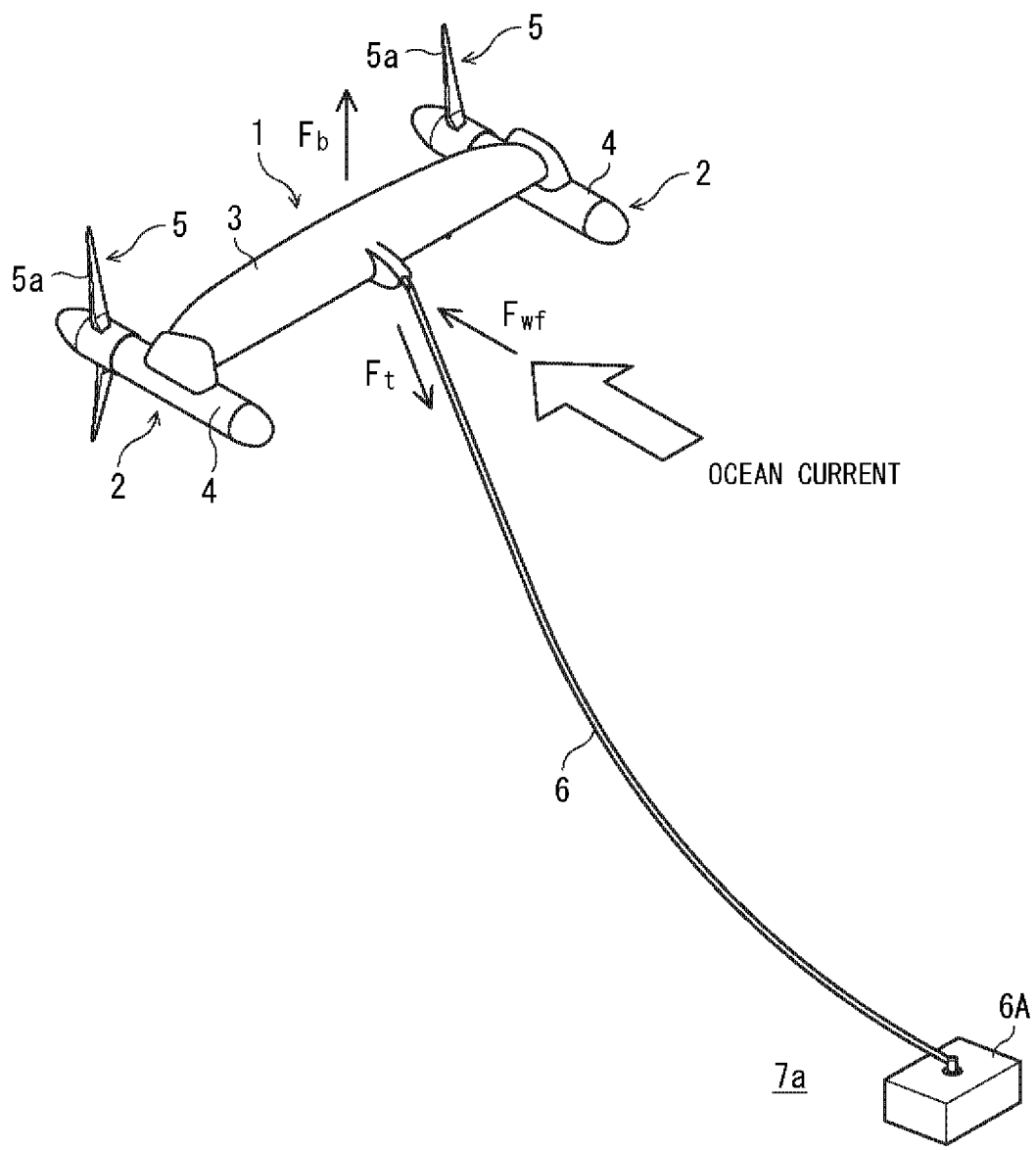
FIG. 3 is a perspective view illustrating the undersea floating ocean current electric power generator in accordance with one embodiment when used under the ocean.

Initially, an overview of a configuration of an undersea floating ocean current electric power generator of the present embodiment will be described. The overview of the undersea floating ocean current electric power generator is similar to that described in background art (refer to FIG. 12). Again, this undersea floating ocean current electric power generator is configured as a float 1, and the float 1 is a catamaran type with one float 1 configured from two ocean current electric power generator main bodies 2, 2 and a structure 3 coupling them, as shown in FIG. 3. Each ocean current electric power generator main body 2 includes an electric power generator 9 inside a nacelle (also referred to as a "pod") 4, and a rotor shaft (rotation axis, main axis) 5A of a rotatable wing 5 is connected to the rotor of the electric power generator 9 (refer to FIG. 1).

The nacelles 4 are coupled to left and right ends of the structure 3. The distal end of a mooring cable 6 is coupled to the left-right direction center of the structure 3, and the proximal end of the mooring cable 6 is moored to an ocean bottom 7a (in this example, an moor weight 6A on the ocean bottom 7a). The float 1 remains under the ocean in the horizontal direction and in the vertical direction in the range restricted by the mooring cable 6. The buoyancy of the float 1 balances the float 1 left and right, and the structure 3 of the float 1 has a wing shape facing the ocean current direction. As a result, the float 1 generates electric power, when receiving the ocean current on the front face (the front face of the rotatable wing 5) while changing its orientation in response to a change in the direction of the ocean current, such that the front face thereof opposes to the ocean current direction.

Each ocean current electric power generator main body 2 employs a downstream scheme wherein the rotatable wing 5 is disposed at the rear of the nacelle 4 (the downstream to the ocean current). By disposing the rotatable wing 5 downstream to the nacelle 4 in this manner, it become easier to orient the front face of the float 1 (the front face of the rotatable wing 5) to face the ocean current direction. It is difficult to provide the undersea floating ocean current electric power generator with a driving apparatus that actively controls the yaw direction of the float 1 (controls to align the rotor shaft 5A of the rotatable wing 5 to the ocean current direction). The downstream scheme is employed for that reason, and the nacelles 4 of the float 1 and the structure 3 are shaped to orient to the ocean current direction such that the front face of the float 1 passively faces the ocean current direction.

While the float (undersea floating ocean current electric power generator) 1 moored to the mooring cable 6 remains under the ocean, the float 1 stays in the position where the ocean current force Fwf exerted on the float 1, the buoyancy Fb exerted on the float 1, and the tension Ft of the mooring cable 6 mooring the float 1, are balanced. Specifically, on the float 1, the buoyancy Fb acts vertically upward, the ocean current force Fwf acts in the ocean current direction (horizontal direction), and 6 the tension Ft of the mooring cable 6 acts against the buoyancy Fb and the ocean current force Fwf.

Figure 4:
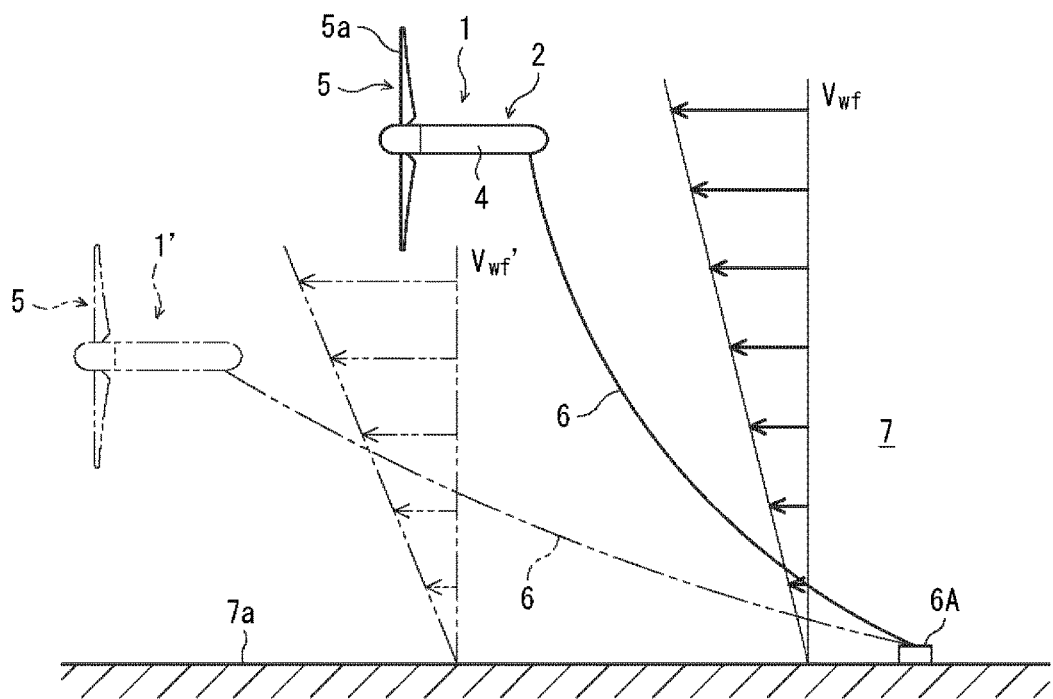
FIG. 4 is a side view of the undersea floating ocean current electric power generator in accordance with one embodiment under the ocean, for illustrating a passive depth control (PDC)

Therefore, as shown in FIG. 4, if the ocean current force Fwf is smaller (i.e., if the current speed Vwf of the ocean current is lower), the float 1 ascends to a relatively shallow depth in the ocean. If the ocean current force Fwf is greater (i.e., if the ocean current speed Vwf' is higher), the float 1 descends to a relatively deep depth, as shown by the reference symbol 1' down the ocean 7. The depth direction profile of the 16 current speed Vwf, Vwf' of the ocean current is such that the current speed reduces as the distance from the ocean bottom 7a is smaller in the vicinity of the ocean bottom 7a, and the current speed increases as the distance from the ocean bottom 7a increases.

Therefore, when the current speed of the ocean current increases, the float 1 descends from the state indicated by the solid line to the state indicated by the two-dot chain line and the reference symbol 1' in FIG. 4 down the ocean 7, and is balanced at a depth where the current speed is appropriately low in the current speed profile in the depth direction. Although not shown, when the current speed of the ocean current becomes smaller than the solid line state shown in FIG. 4, the float 1 ascends from the state indicated by the solid line in the ocean, and is balanced at a depth where the current speed is appropriately high in the current speed profile in the depth direction. The control where the depth direction level (depth of water) of the undersea floating ocean current electric power generator configured as the float 1 is passively and autonomously adjusted in this manner is referred to as a PDC (passive depth control). The PDC ensures that the rotatable wing 5 receives a sufficient current speed of the ocean current, and an electric power generation is achieved with the stable current speed of the ocean current.

Figure 1:
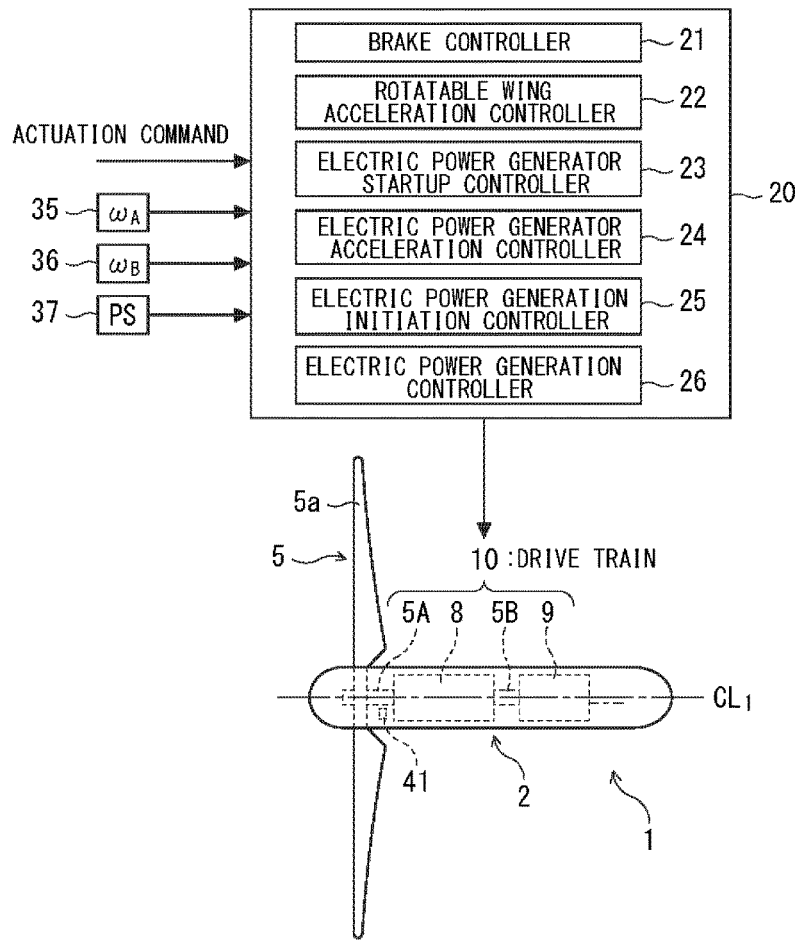
FIG. 1 is a configuration diagram showing an undersea floating ocean current electric power generator and an actuation control apparatus therefor, in accordance with one embodiment.

As shown in FIGS. 1 and 3, each ocean current electric power generator main body 2 includes the rotatable wing 5 disposed at the rear (the downstream to the ocean current) of the nacelle 4, and the rotor shaft 5A of the rotatable wing 5, an electric power generator 9, and a power transmission mechanism 8 disposed between the rotor shaft 5A and the rotor (not shown) of the electric power generator 9 are provided within the nacelle 4. A drive train 10 of the ocean current electric power generator main body 2 is configured from the rotor shaft 5A, the power transmission mechanism 8, and the electric power generator 9. A mechanical brake (mechanical brake) 41 to restrict rotations of the rotor shaft 5A is provided at the rotor shaft 5A. The power transmission mechanism 8 has essential functions unique to the actuation method and the actuation control apparatus of the present invention, which will be described later.

The outer shape of each nacelle 4 has smooth curved surfaces at the front end and the rear end thereof and has an intermediate section in a cylindrical shape, and the axis $CL_1$ of the outer shape of the nacelle 4 is aligned with the axis of the rotor shaft 5A. The outer shape of the nacelle 4 may have other shapes, such as a spindle shape. The rotatable wing is a dual wing where two blades 5a are disposed so as to be distant from each other by 180°. The number of blades 5a of the rotatable wing 5 is not limited to two, and more or less blades, such as those in a triple wing, may be provided.

The rotatable wing 5 is a fixed pitch angle wing where the pitch angles of the blades 5a are fixed. A fixed pitch angle wing is simple and maintenance-free. Unlike a variable pitch angle wing that requires a mechanism for varying the pitch angle and a driving source, and requires maintenances for them, a fixed pitch angle wing does not require such maintenances.

(Configuration of Power Transmission Mechanism)

The power transmission mechanism 8 has a function to switch the rotor shaft 5A and the electric power generator 9 between a power transmission state and a power disconnection state (switching section); a function to apply a rotation load on the rotor shaft 5A of the rotatable wing 5 during the power disconnection state (load application section); and a function to vary the revolution speed of the rotor shaft 5A of the rotatable wing 5 and transmit it to the rotor of the electric power generator 9 during the power transmission state (speed varying section). As the power transmission mechanism 8, a hydraulic power transmission mechanism employing oil pressures is used.

Figure 2:
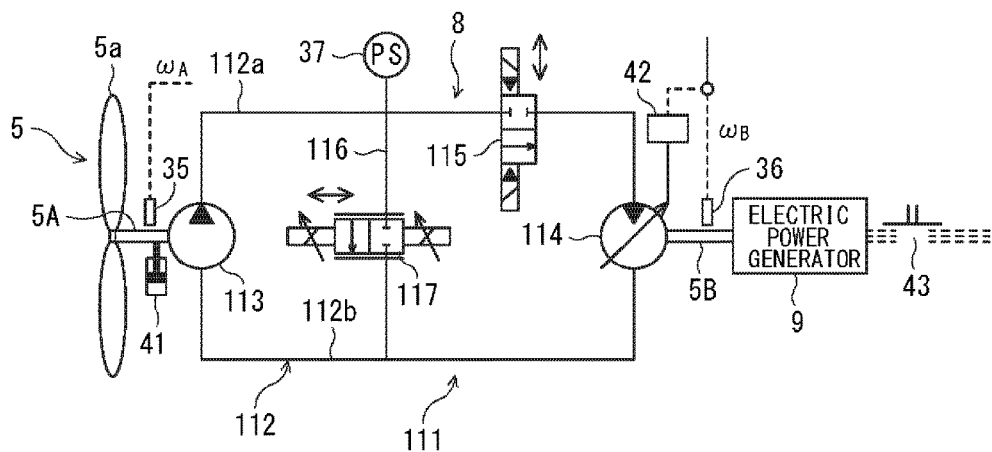
FIG. 2 is a configuration diagram showing a hydraulic power transmission mechanism in accordance with one embodiment.

FIG. 2 is a configuration diagram showing the hydraulic power transmission mechanism 8 in accordance with the present embodiment. As shown in FIG. 2, the hydraulic power transmission mechanism 8 includes a hydraulic pump 113, a hydraulic motor 114, a switching valve 115, an oil bypass route 116, and a bypass valve 117, on a circulation oil route 112 constructed from an oil feed route 112a and an oil return route 112b. A mechanical brake 41 is provided at the rotor shaft 5A.

The hydraulic pump 113 is driven by the rotor shaft 5A of the rotatable wing 5.

The hydraulic motor 114 is rotated by hydraulic oil that is discharged from the hydraulic pump 113 and fed to the hydraulic motor 114 through the oil feed route 112a. The rotation axis 5B of the hydraulic motor 114 is coupled to the rotor of the electric power generator 9 for driving the electric power generator 9.

The hydraulic motor 114 is a swash plate type hydraulic motor wherein the revolution speed is variable by adjusting a swash plate angle, irrespective of an input oil pressure. The number of revolution (revolution speed) of the rotation axis 5B of the hydraulic motor 114 is detected by a revolution number sensor (revolution speed sensor) 36, which will be described later, and is fed back. As a result, a swash plate angle adjusting mechanism (not shown) is operated by a swash plate angle adjustor 42, and the angle of the swash plate (not shown) is adjusted, thereby adjusting the hydraulic motor 114 to a desired revolution speed state. In this manner, the swash plate angle adjusting mechanism functions as a rotation control mechanism. Further, that rotation control mechanism also has a function as a speed-increasing gear to steeply increase the speed of the hydraulic motor 114 relative to that of the hydraulic pump 113.

The switching valve 115 is a solenoid valve that is disposed downstream to the branch from the oil bypass route 116 in the oil feed route 112a, and opens or closes the oil feed route 112a in response to an electric signal, to switch between the power transmission state and the power disconnection state.

The oil bypass route 116 is disposed between the oil feed route 112a and the oil return route 112b, to bypass the hydraulic oil from an upstream to the switching valve 115 on the oil feed route 112a (intermediate point between the hydraulic pump 113 and the switching valve 115) to the oil return route 112b.

The bypass valve 117 is a solenoid valve that is disposed in the oil bypass route 116, and opens or closes the oil bypass route 116 in response to an electric signal.

Note that the switching valve 115 functions as the above-described switching section.

The hydraulic pump 113 functions as the above-described load application section when the hydraulic pump 113 is activated, the switching valve 115 is set to closed (the power disconnection state), and the bypass valve 117 is set to open, and while the hydraulic oil circulates through an upstream part to the oil feed route 112a, the oil bypass route 116 and a downstream part to the oil return route 112b.

The rotation control mechanism for the hydraulic motor 114 functions as the above-described speed varying section.

A revolution number sensor (revolution speed sensor) 35 that detects the number of revolution (revolution speed) $\omega_A$ of the rotor shaft 5A is provided at the rotor shaft 5A of the rotatable wing 5, and a revolution number sensor (revolution speed sensor) 36 that detects the number of revolution (revolution speed) $\omega_B$ of the rotation axis 5B is provided at the rotation axis 5B of the hydraulic motor 114. Further, an oil pressure sensor 37 that detects the oil pressure of the hydraulic oil in the oil feed route 112a in the circulation oil route 112 is also provided. Signals detected by those sensors 35 to 37 are input to a control apparatus 20.

(Configuration of Actuation Control Apparatus)

In the present embodiment, when actuating the ocean current electric power generator under the ocean, preprocessing steps of actuation processing are carried out through functional elements as an actuation controller (actuation control apparatus) assigned to the control apparatus 20.

Specifically, as shown in FIG. 1, the actuation controller of the control apparatus 20 includes a brake controller (brake control section) 21, a rotatable wing acceleration controller (rotatable wing acceleration control section) 22, an electric power generator startup controller (electric power generator startup control section) 23, an electric power generator acceleration controller (electric power generator acceleration control section) 24, an electric power generation initiation controller (electric power generation initiation control section) 25, and an electric power generation controller (electric power generation control section) 26, as the functional elements.

The brake controller 21 operates to close the switching valve 115 (sets to the power disconnection state) in response to an actuation command, and switches the mechanical brake 41 from an applied state to a released state, to release the brake. At this time, the brake controller 21 also operates to close the bypass valve 117.

Once the release of the brake completes, the rotatable wing acceleration controller 22 operates to open the bypass valve 117, to form the bypass circuit where the hydraulic oil circulates through the upstream part to the oil feed route 112a, the oil bypass route 116 and the downstream part to the oil return route 112b, and activates the hydraulic pump 113. The hydraulic pump 113 is activated in response to the rotor shaft 5A of the rotatable wing 5 being rotated, to cause the hydraulic oil to circulate through the bypass circuit. Note that whether the release of the brake completes or not can be determined by determining whether certain time elapses after the brake releasing command is issued, for example.

Figure 5:
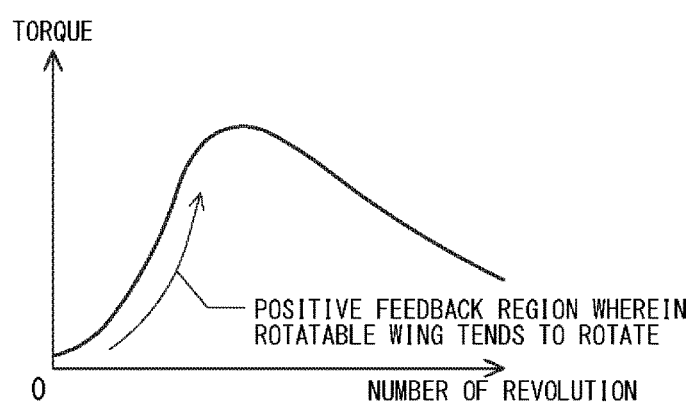
FIG. 5 is a diagram showing the actuation characteristic of the undersea floating ocean current electric power generator in accordance with one embodiment.

Since the circulation of the hydraulic oil exerts a rotation load on the rotor shaft 5A, as shown in FIG. 5, in the positive feedback region where the rotatable wing 5 tends to rotate, the number of revolution of the rotor shaft 5A of the rotatable wing 5 gradually increases. Thus, the number of revolution $\omega_A$ of the rotor shaft 5A of the rotatable wing 5 and the acting torque by the ocean current on the rotatable wing can be increased gently in a stable manner.

Once the number of revolution $\omega_A$ of the rotor 5A of the rotatable wing 5 increases and stabilizes, the electric power generator startup controller 23 operates to open the switching valve 115 (sets to the power transmission state) to initiate a rotation of the rotor of the electric power generator 9. Note that the number of revolution $\omega_A$ of the rotor 5A is input from the revolution number sensor 35, for example, and a determination as to whether the number of revolution $\omega_A$ increases and stabilizes can be made when the number of revolution $\omega_A$ becomes equal to or greater than a setting value and the change rate of the number of revolution $\omega_A$ becomes equal to or smaller than a setting value.

Once the rotation of the rotor of the electric power generator 9 is initiated, the electric power generator acceleration controller 24 operates the rotation control mechanism for the hydraulic motor 114 to increase the revolution speed of the rotor of the electric power generator 9. Specifically, the tilt of the swash plate of the hydraulic motor 114 is controlled, and the rotor of the electric power generator 9 is accelerated. Since the rotation of the rotor of the electric power generator 9 is equivalent to the rotation of the rotation axis 5B of the hydraulic motor 114, a determination as to whether the rotation of the rotor of the electric power generator 9 is initiated can be made from the number of revolution $\omega_B$ of the rotation axis 5B of the hydraulic motor 114 input from the revolution number sensor 36.

Once the number of revolution (revolution speed) of the rotor of the electric power generator 9 increases to a predetermined revolution number region (predetermined revolution speed region), the electric power generation initiation controller 25 combines the electric power generator 9 to the system power supply to initiate a power generation. Note that the combine to the system power supply is achieved by the switch 43, and the switch 43 combines the electric power generator 9 to the system power supply in response to a connection command. At this time, a soft starter function is provided and is used to the switch 43 so as to prevent an abrupt inrush current from being sent to the system power supply. Note that a determination as to whether the number of revolution of the rotor of the electric power generator 9 is increased can be made by comparing the number of revolution $\omega_B$ of the rotation axis 5B of the hydraulic motor 114 input from the revolution number sensor 36 with a setting value.

The electric power generation controller 26 carries out controls during a normal electric power generation by the ocean current electric power generator. Once the PDC is activated after power generation is initiated, the electric power generation controller 26 operates to close the bypass valve 117. As a result, the control on the number of revolution of the rotor shaft 5A of the rotatable wing 5 ends, and transitions to a torque control of the electric power generator 9 only. The electric power generation controller 26 controls the power generation by means of the torque control by the electric power generator 9.

(Method of Actuating Ocean Current Electric Power Generator)

Figure 6:
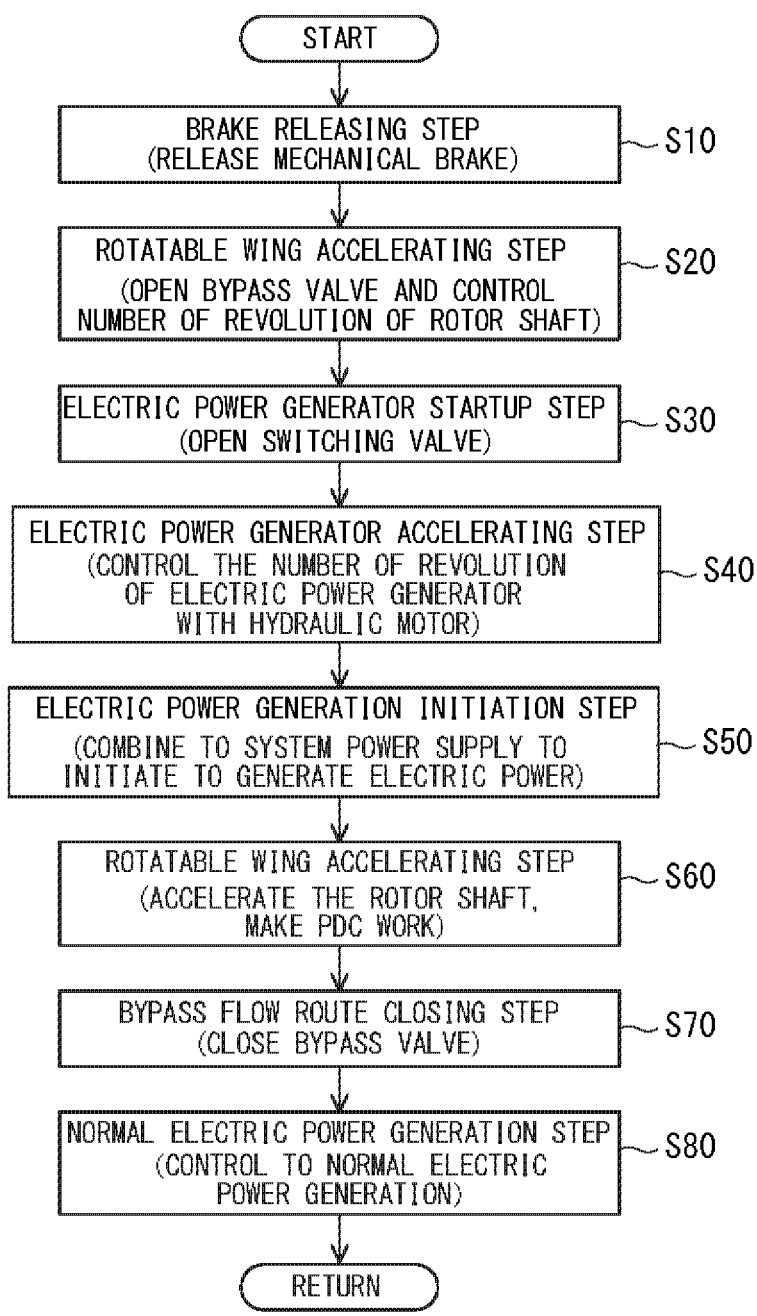
FIG. 6 is a flowchart showing a method of actuating the undersea floating ocean current electric power generator in accordance with one embodiment.
Figure 7:
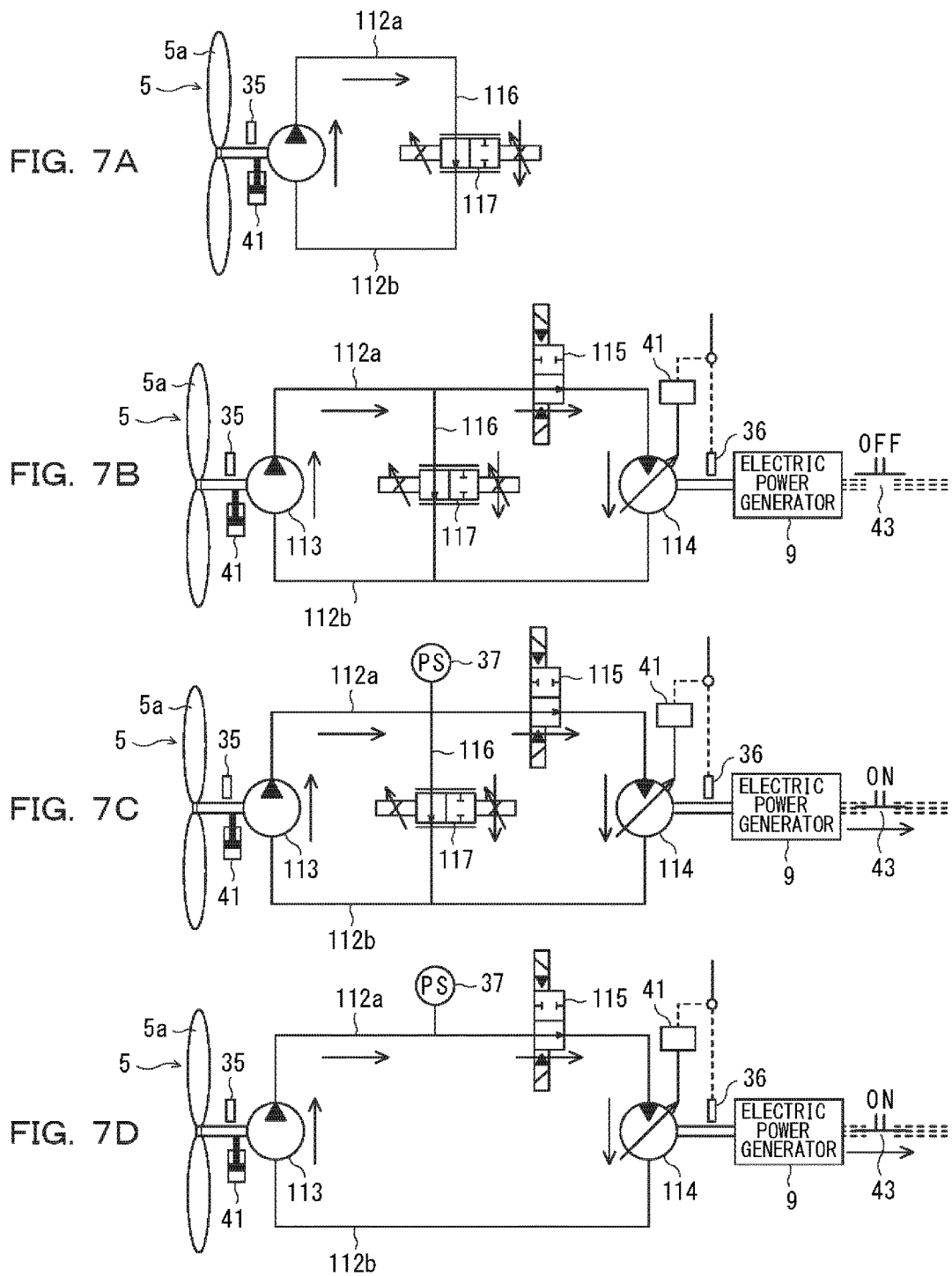

The ocean current electric power generator and the actuation control apparatus therefor in accordance with the present embodiment are configured as described above, and a method of actuating the ocean current electric power generator in accordance with the present embodiment can be embodied using that apparatus, as shown in FIGS. 6 and 7 (FIGS. 7A-7D). Note that preprocessing for an actuation of the ocean current electric power generator is carried out while the depth of the float 1 is restricted such that the ocean current electric power generator remains in the vicinity of the surface of the ocean.

(Flowchart)

As shown in FIG. 6, for actuating the ocean current electric power generator, initially, the switching valve 115 is closed (set to the power disconnection state), and the mechanical brake 41 is switched from the applied state to the released state to release the brake (Step S10, brake releasing step).

After the releasing of the brake is completed, subsequently, as shown in FIG. 7A, the bypass valve 117 is opened to form the bypass circuit, the hydraulic pump 113 is activated, and the number of revolution of the rotor shaft 5A of the rotatable wing 5 is controlled (Step S20, rotatable wing accelerating step). Since the circulation of hydraulic oil established by the hydraulic pump 113 applies a rotation load on the rotor shaft 5A, in the positive feedback region where the rotatable wing 5 tends to rotate, the number of revolution $\omega_A$ of the rotor shaft 5A of the rotatable wing 5 and the acting torque by the ocean current on the rotatable wing 5 increase gently in a stable manner. Thus, the disadvantage of an abrupt acceleration of the rotor shaft 5A of the rotatable wing 5 is avoided.

Once the number of revolution $\omega_A$ of the rotor shaft 5A of the rotatable wing 5 increases and is stabilized, subsequently, as shown in FIG. 7B, the switching valve 115 is opened (set to the power transmission state) to introduce the hydraulic oil discharged from the hydraulic pump 113 to the hydraulic motor 114, and a rotation of the rotor of the electric power generator 9 by the hydraulic motor 114 is initiated (Step S30, electric power generator startup step).

After the rotation of the rotor of the electric power generator 9 is initiated, subsequently, the rotation control mechanism for the hydraulic motor 114 is operated to increase the revolution speed of the rotor of the electric power generator 9 (Step S40, electric power generator accelerating step).

Once the number of revolution of the rotor of the electric power generator 9 is increased to a predetermined revolution number region, subsequently, as shown in FIG. 7C, the switch 43 is switched from OFF to ON to combine the electric power generator 9 to the system power supply, thereby initiating a power generation (Step S50, electric power generation initiation step). At this time, a soft start function is applied.

Once the power generation is initiated, the restriction on the depth of the float 1 of the ocean current electric power generator is released such that the float 1 sinks down to a predetermined depth region under the surface of the ocean where a current speed is high. Also, the PDC is activated and simultaneously the rotor shaft 5A of the rotatable wing 5 is accelerated (Step S60, rotatable wing accelerating step).

Once the float 1 sinks down to the predetermined depth region and the PDC is activated, the bypass valve 117 is switched to closed, to stop further circulations of the hydraulic oil (Step S70, bypass flow route closing step).

After the bypass valve 117 is closed, as shown in FIG. 7D, a normal electric power generation is carried out (Step S80, normal electric power generation step). In the normal electric power generation, the number of revolution of the rotor of the electric power generator 9 is controlled such that a power generation efficiency is maximized.

(Time Charts)

FIGS. 8 to 11 (FIGS. 11A-11G) are time charts showing the states of the respective elements when the ocean current electric power generator is actuated. In FIGS. 8 to 11 (FIGS. 11A-11G), the horizontal axes represent the same time line where time points $t_1$ to $t_{11}$ represent events over time. Referring to these time charts, specific examples of transitions of the respective elements when the present actuation method is carried out will be described.

Figure 9:
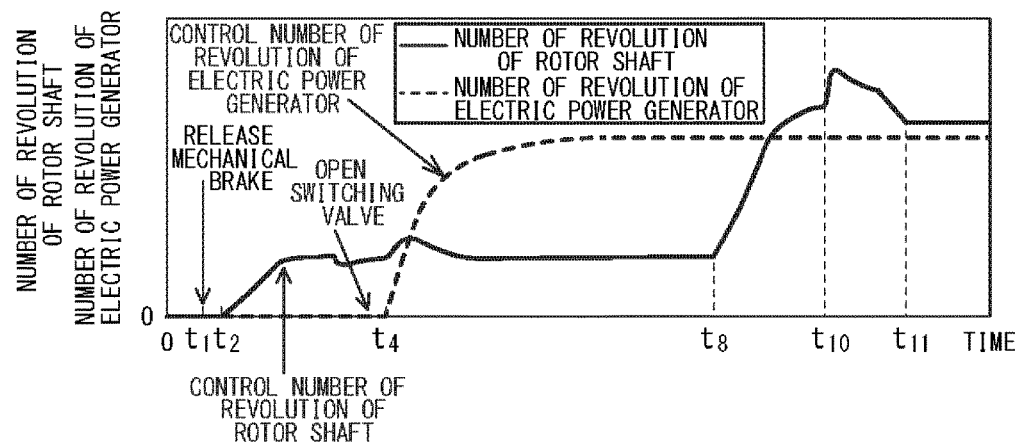
FIG. 9 is a time chart illustrating the method of actuating the undersea floating ocean current electric power generator in accordance with one embodiment, showing changes in the number of revolutions (revolution speeds) of the rotor shaft of the rotatable wing and the rotor of the electric power generator.
Figure 11A:
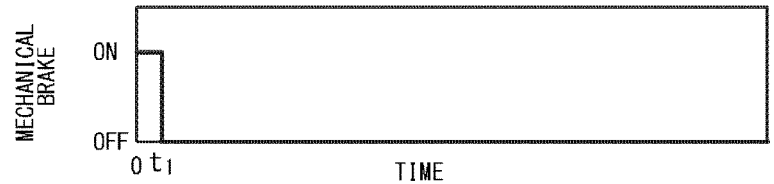
Figure 11B:
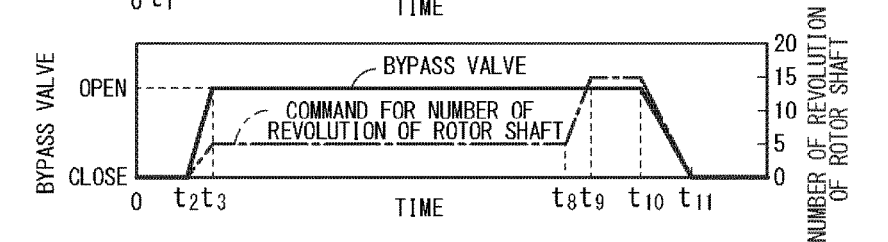

As shown in FIG. 11A, at the time point $t_1$, the mechanical brake is released from ON to OFF (brake releasing step). Subsequently, as shown in FIG. 11B, during the time points $t_2$ to $t_3$, when the bypass valve 117 is switched to open, the rotor shaft 5A of the rotatable wing 5 starts to rotate (brake releasing step), as shown in FIG. 9. Since this triggers an activation of the hydraulic pump 113, the number of revolution of the rotor shaft 5A of the rotatable wing 5 is controlled to increase gently (rotatable wing accelerating step).

Figure 11C:
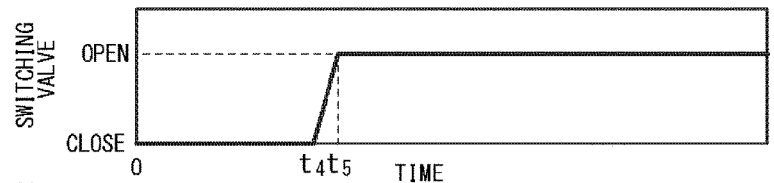

Subsequently, as shown in FIG. 11C, during the time points $t_4$ to $t_5$, when the switching valve 115 is switched from closed to open, as shown in FIG. 9, the electric power generator 9 is also started (electric power generator startup step).

Subsequently, as shown in 11D, the hydraulic motor is controlled based on the control on the number of revolution of the electric power generator 9, to increase the number of revolution of the rotor of the electric power generator 9 (electric power generator accelerating step).

Figure 11D:
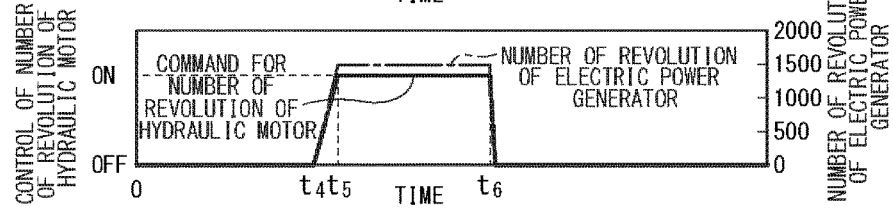
Figure 11E:
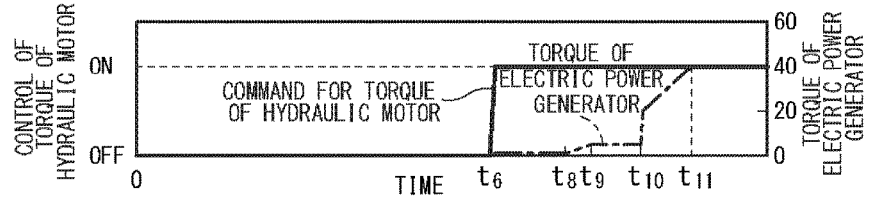
Figure 11F:
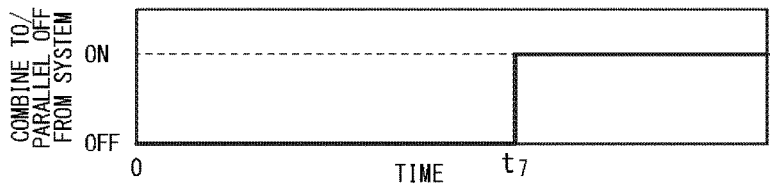

Once the number of revolution of the electric power generator 9 is increased, at the time point $t_6$, the control on the electric power generator 9 by means of the hydraulic motor 114 is transitioned from the control of number of revolution to the torque control, as shown in FIGS. 11D and 11E. Subsequently, as shown in FIG. 11F, at the time point $t_7$, the electric power generator 9 is combined to the system power supply to initiate a power generation (electric power generation initiation step).

Figure 8:
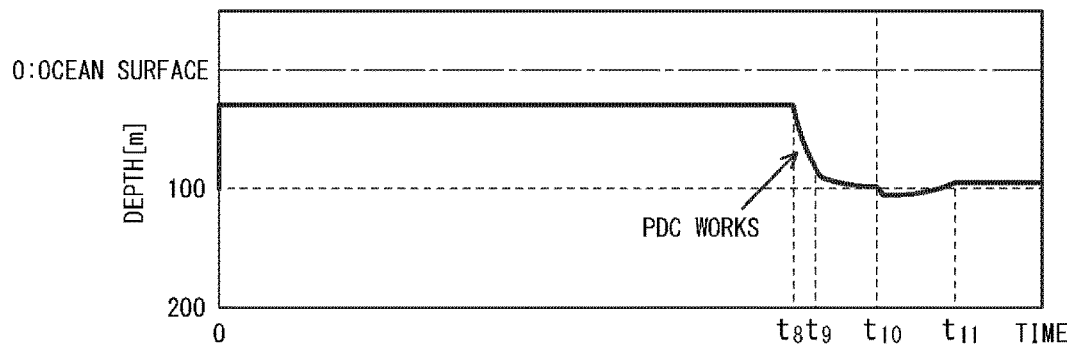
FIG. 8 is a time chart illustrating the method of actuating the undersea floating ocean current electric power generator in accordance with one embodiment, showing the change in the depth when the undersea floating ocean current electric power generator is actuated.
Figure 11G:
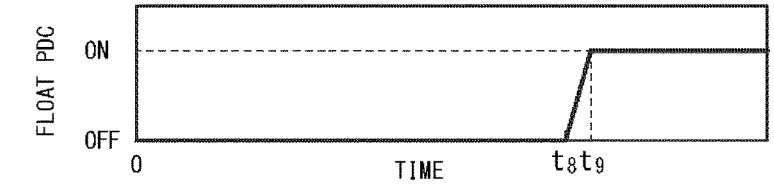

The float 1 of the ocean current electric power generator has remained in the vicinity of the surface of the ocean. Once the power generation is initiated, however, the rotatable wing receives the fluid force of the ocean current to accelerate the rotatable wing 5 and the rotor shaft 5A thereof, as shown in FIG. 8, at the time point $t_8$, and the mooring cable for restricting the depth of the float 1 in the normal direction is released and the PDC is activated, as shown in FIG. 11G. As a result, during the time points $t_8$ to $t_9$, the float 1 sinks down to a predetermined depth region (revolution number accelerating step).

Once the float 1 sinks down to the predetermined depth region, subsequently, as shown in FIG. 11B, during the time points $t_{10}$ to $t_{11}$, the bypass valve 117 is switched to closed to terminate the control on the number of revolution of the rotor shaft 5A of the rotatable wing 5. As a result, as shown in FIG. 11E, the torque of the electric power generator 9 increases, and a transition to a normal electric power generation is made possible.

Figure 10:
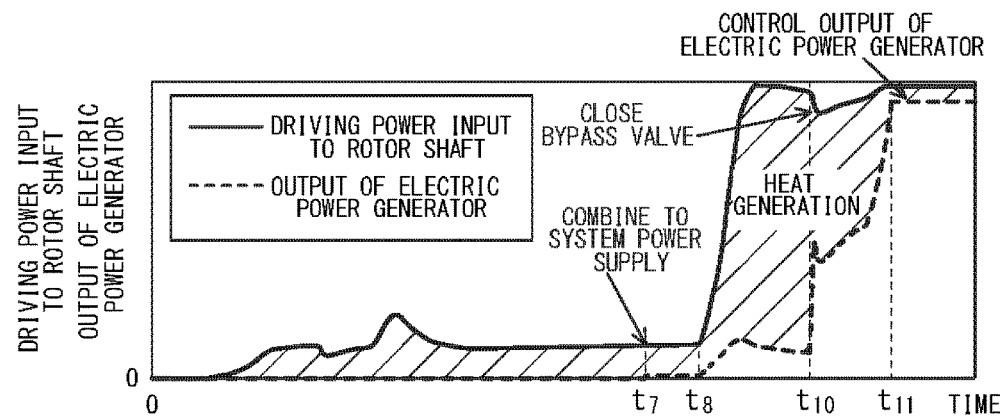
FIG. 10 is a time chart illustrating the method of actuating the undersea floating ocean current electric power generator in accordance with one embodiment, showing changes in an input driving power to the rotor shaft of the rotatable wing and the output from the electric power generator.

FIG. 10 shows changes in the input driving power to the rotor shaft 5A (input driving power to the rotor shaft) and the output driving power from the electric power generator 9 (the output from the electric power generator). The difference between the input driving power to the rotor shaft and the output from the electric power generator (hatched region) represents generated thermal energy (thermal energy to be dissipated) which is to be dissipated as the heat capacity. The heat is generated only until the float 1 sinks down to the predetermined depth to transition to the normal electric power generation during the time points $t_8$ to $t_{11}$, and it is apparent that the heat generation is suppressed.

(Advantageous Effects)

As described above, in accordance with the actuation method and the actuation control apparatus in accordance with the present embodiment, since the revolution speed is increased while a rotation load is applied on the rotor shaft 5A when a rotation of the rotor shaft 5A of the rotatable wing 5 is initiated, an abrupt increase in the revolution speed is prevented and the rotor shaft 5A is accelerated gently (refer to FIG. 5). Therefore, even with the rotatable wing 5 of fixed pitch angle type having greater wing projection areas upon an actuation, in the positive feedback region where the rotatable wing 5 tends to rotate, the revolution speed of the rotor shaft of the rotatable wing 5 and the acting torque by the ocean current on the rotatable wing 5 can be increased gently in a stable manner. Thus, the disadvantage of an abrupt acceleration of the rotor shaft 5A of the rotatable wing 5 is avoided.

Thereafter, when a rotation of the rotor of the electric power generator 9 is started, the rotation can be started smoothly. This achieves a smooth actuation of the ocean current electric power generator with the rotatable wing 5 having a fixed pitch angle wing.

Thereafter, since the revolution speed of the rotor of the electric power generator 9 is increased in a controlled manner and the electric power generator 9 is combined to the system power supply, a heat generation can be suppressed during a latency period of the electric power generator 9 until the electric power generator 9 is combined into the system power supply (refer to FIG. 10). There is also another advantage of reducing the size of a cooling apparatus for the ocean current electric power generator.

(Miscellaneous)

While an embodiment of the present invention has been described, the present invention may be practiced by modifying or combining the embodiment where appropriate, without departing from the spirit thereof.

For example, in the above-described embodiment, the float 1 is configured to automatically carry out the brake releasing step, the rotatable wing accelerating step, the electric power generator startup step, and the electric power generation initiation step by the control apparatus 20 triggered by an actuation command signal, while restricting the depth in the vicinity of the surface of the ocean. The actuation method of the present invention is not limited to the disclosed one and each step may be carried out manually by humans.

Furthermore, in the above-described embodiment, an undersea floating ocean current electric power generator has used as an example. While the present invention is suitable for undersea floating ocean current electric power generators, ocean current electric power generators to which the present invention is applicable not limiting the disclosed one.

Furthermore, since a hydraulic power transmission mechanism is employed as a power transmission mechanism in the above-described embodiment, a smoother activation can be achieved by utilizing the energy absorption capacity of the hydraulic oil. Power transmission mechanism, however, are not limiting to hydraulic power transmission mechanism.

Specifically, any power transmission mechanisms can be used, as long as the power transmission mechanism includes a section to switch between a power transmission state and a power disconnection state (switching section), a section to apply a rotation load on a rotor of a rotatable wing during the power disconnection state (load application section), and a section to vary the revolution speed of the rotor of the rotatable wing and transmit it to the rotor of the electric power generator during the power transmission state (speed varying section)

Furthermore, a certain advantages may be achieved by carrying out any one of the brake releasing step, the rotatable wing accelerating step, the electric power generator startup step, the electric power generator accelerating step, and the electric power generation initiation step, among the steps in the present method.

REFERENCE SIGNS LIST

1 Float (undersea floating ocean current electric power generator)
2 Ocean current electric power generator main body
3 Structure
4 Nacelle (pod)
5 Rotatable wing
5A Rotor shaft (rotation axis, main axis of rotatable wing 5)
5B Rotation axis of hydraulic motor 114
5a Blade
6 Mooring cable
6A Moor weight
7 Under the ocean
7a Ocean bottom
8 Hydraulic power transmission mechanism
9 Electric power generator
10 Drive train
20 Control apparatus (actuation control apparatus)

21 Brake controller (brake control section)
22 Rotatable wing acceleration controller (rotatable wing acceleration control section)
23 Electric power generator startup controller (electric power generator startup control section)
24 Electric power generator acceleration controller (electric power generator acceleration control section)
25 Electric power generation initiation controller (electric power generation initiation control section)
26 Electric power generation controller (electric power generation control section)
35, 36 Revolution number sensor (revolution speed sensor)
37 Pressure sensor
111 Oil hydraulic circuit
112 Oil route
112a Oil feed route
112b Oil return route
113 Hydraulic pump
114 Hydraulic motor
115 Open/close valve
116 Oil bypass route
117 Bypass valve

The invention claimed is:

1. A method of actuating an ocean current electric power generator in an ocean, the ocean current electric power generator comprising a nacelle, a rotatable wing disposed on the nacelle and including blades each having a fixed pitch angle, an electric power generator enclosed in the nacelle, and a rotor of the electric power generator driven by the rotatable wing,
   a mechanical brake that restricts a rotation of a rotor shaft of the rotatable wing and
   a power transmission mechanism that is disposed between the rotor shaft of the rotatable wing and the rotor of the electric power generator, the power transmission mechanism comprising
      a switching section that switches between a power transmission state and a power disconnection state,
      a load application section that applies a rotation load on the rotor shaft of the rotatable wing during the power disconnection state, and
      a speed varying section that varies a revolution speed of the rotor shaft of the rotatable wing, and transmits a revolution of the rotor shaft of the rotatable wing to the rotor of the electric power generator during the power transmission state,
   the method comprising the following steps that are carried out in sequence:
      a brake releasing step of setting the power transmission mechanism to the power disconnection state by the switching section to switch the mechanical brake from an applied state to a released state;
      a rotatable wing accelerating step of increasing the revolution speed of the rotor shaft of the rotatable wing while applying the rotation load on the rotor shaft of the rotatable wing by the load application section;
      an electric power generator startup step of switching the power transmission mechanism to the power transmission state by the switching section, and initiating the a rotation of the rotor of the electric power generator;
      an electric power generator accelerating step of increasing a revolution speed of the rotor of the electric power generator by the speed varying section; and
      an electric power generation initiation step of initiating power generation of the electric power generator by connecting the electric power generator to a system power supply.

2. The method of actuating the ocean current electric power generator according to claim 1, wherein
   the brake releasing step, the rotatable wing accelerating step, the electric power generator startup step, the electric power generator accelerating step, and the electric power generation initiation step are carried out while the ocean current electric power generator is configured as a float that is an undersea floating ocean current electric power generator that generates electric power, remaining in the ocean while being moored to a bottom of the ocean with a mooring cable thereby restricting a depth level of the float,
   the method further comprises:
      a revolution number accelerating step of sinking the ocean current electric power generator to a predetermined depth region where an ocean current speed is higher than a current speed of the surface of the ocean, and increasing the revolution speed of the rotor shaft of the rotatable wing, the revolution number accelerating step being carried out after the electric power generation initiation step.

3. The method of actuating the ocean current electric power generator according to claim 2, wherein
   the power transmission mechanism is a hydraulic power transmission mechanism that transmits a driving power using hydraulic oil,
   the hydraulic power transmission mechanism comprises:
      a hydraulic pump driven by the rotor shaft of the rotatable wing;
      a hydraulic motor that functions as the speed varying section, the hydraulic motor being provided with a rotation control mechanism;
      an oil feed route that connects the hydraulic pump to the hydraulic motor and that feeds hydraulic oil from the hydraulic pump to the hydraulic motor;
      an oil return route that connects the hydraulic motor to the hydraulic pump and that returns the hydraulic oil from the hydraulic motor to the hydraulic pump;
      a switching valve that functions as the switching section, the switching valve opens and closes the oil feed route;
      an oil bypass route that connects a point on the oil feed route between the hydraulic pump and the switching valve to the oil return route; and
      a bypass valve that opens and closes the oil bypass route,
   the brake releasing step comprises closing the switching valve and the bypass valve to release the mechanical brake,
   the rotatable wing accelerating step comprises switching the bypass valve to open, to increase the revolution speed of the rotor shaft of the rotatable wing while applying the rotation load on the rotor shaft of the rotatable wing with an operation load of the hydraulic pump;
   the electric power generator startup step comprises switching the switching valve to open to initiate the rotation of the rotor of the electric power generator; and
   the electric power generator accelerating step comprises increasing the revolution speed of the rotor of the electric power generator.

4. The method of actuating the ocean current electric power generator according to claim 3, wherein the float undergoes a passive depth control for spontaneously staying at a constant depth level depending on a balance among a buoyancy acting on the float, an acting force applied on the float by an ocean current, and a tension of the mooring cable, when the restriction on the depth level of the float is released.

5. The method of actuating the ocean current electric power generator according to claim 1, wherein
the power transmission mechanism is a hydraulic power transmission mechanism that transmits a driving power using hydraulic oil,
the hydraulic power transmission mechanism comprises:
a hydraulic pump driven by the rotor shaft of the rotatable wing;
a hydraulic motor that functions as the speed varying section, the hydraulic motor being provided with a rotation control mechanism;
an oil feed route that connects the hydraulic pump to the hydraulic motor and that feeds hydraulic oil from the hydraulic pump to the hydraulic motor;
an oil return route that connects the hydraulic motor to the hydraulic pump and that returns the hydraulic oil from the hydraulic motor to the hydraulic pump;
a switching valve that functions as the switching section, the switching valve opens and closes the oil feed route;
an oil bypass route that connects a point on the oil feed route between the hydraulic pump and the switching valve to the oil return route; and
a bypass valve that opens and closes the oil bypass route,
the brake releasing step comprises closing the switching valve and the bypass valve to release the mechanical brake,
the rotatable wing accelerating step comprises switching the bypass valve to open, to increase the revolution speed of the rotor shaft of the rotatable wing while applying the rotation load on the rotor shaft of the rotatable wing with an operation load of the hydraulic pump;
the electric power generator startup step comprises switching the switching valve to open to initiate the rotation of the rotor of the electric power generator; and
the electric power generator accelerating step comprises increasing the revolution speed of the rotor of the electric power generator.

6. An actuation control apparatus that actuates an ocean current electric power generator in an ocean, the ocean current electric power generator comprising a nacelle, a rotatable wing disposed on the nacelle and including blades each having a fixed pitch angle, an electric power generator enclosed in the nacelle, and a rotor of the electric power generator driven by the rotatable wing, a mechanical brake that restricts a rotation of a rotor shaft of the rotatable wing and a power transmission mechanism that is disposed between the rotor shaft of the rotatable wing and the rotor of the electric power generator, the power transmission mechanism comprising a switching section that switches between a power transmission state and a power disconnection state, a load application section that applies a rotation load on the rotor shaft of a rotatable wing during the power disconnection state and a speed varying section that varies a revolution speed of the rotor shaft of the rotatable wing, and transmits a revolution of the rotor shaft to the rotor of the electric power generator during the power transmission state,
the actuation control apparatus comprises:
a brake control section that operates, in response to an actuation command, the switching section to set the power transmission mechanism to the power disconnection state, and switches the mechanical brake from an applied state to a releasing state to release the mechanical brake;
a rotatable wing acceleration control section that increases the revolution speed of the rotor shaft of the rotatable wing while applying the rotation load on the rotor shaft of the rotatable wing by the load application section, once the mechanical brake is completely switched to the releasing state;
an electric power generator startup control section that operates the switching section to switch the power transmission mechanism to the power transmission state and initiates a rotation of the rotor of the electric power generator, once the revolution speed of the rotor shaft of the rotatable wing increases and is stabilized;
an electric power generator acceleration control section that operates the speed varying section to increase a revolution speed of the rotor of the electric power generator, once the rotation of the rotor of the electric power generator is initiated; and
a power generation initiation control section that initiates power generation of the electric power generator by connecting the electric power generator to a system power supply.

7. The actuation control apparatus for the ocean current electric power generator according to claim 6, wherein
the power transmission mechanism is a hydraulic power transmission mechanism that transmits a driving power using hydraulic oil,
the hydraulic power transmission mechanism comprises:
a hydraulic pump driven by the rotor shaft of the rotatable wing;
a hydraulic motor being provided with a rotation control mechanisms
an oil feed route that connects the hydraulic pump to the hydraulic motor and that feeds hydraulic oil from the hydraulic pump to the hydraulic motor;
an oil return route that connects the hydraulic motor to the hydraulic pump and that returns the hydraulic oil from the hydraulic motor to the hydraulic pump;
a switching valve that functions as the switching section, the switching valve opens and closes the oil feed route;
an oil bypass route that connects a point on the oil feed route between the hydraulic pump and the switching valve to the oil return route; and
a bypass valve that opens and closes the oil bypass route,
the brake control section and the bypass valve to close, to thereby release the mechanical brake
the rotatable wing acceleration control section operates the bypass valve to open, to increase thereby the revolution speed of the rotor shaft of the rotatable wing while applying the rotation load on the rotor shaft of the rotatable wing with an operation load of the hydraulic pump,
the electric power generator startup control section operates the switching valve to open to initiate thereby the rotation of the rotor of the electric power generator,
the electric power generator acceleration control section increases a revolution speed of the hydraulic motor by the rotation control mechanism to increase the revolution speed of the rotor of the electric power generator.

* * * * *